United States Patent [19]

Blasbalg

[11] 4,231,113

[45] Oct. 28, 1980

[54] ANTI-JAM COMMUNICATIONS SYSTEM

[75] Inventor: Herman L. Blasbalg, Baltimore, Md.

[73] Assignee: International Business Machines Corporation, Armonk, N.Y.

[21] Appl. No.: 713,564

[22] Filed: Mar. 11, 1968

Related U.S. Application Data

[63] Continuation of Ser. No. 378,302, Jun. 26, 1964.

[51] Int. Cl.[3] .......................... H04K 1/02; H04L 9/02

[52] U.S. Cl. .......................................... 455/29; 375/1; 179/1.5 R

[58] Field of Search ...................... 325/32, 34; 178/22; 179/1.5 R, 1.5 FS

[56] References Cited

U.S. PATENT DOCUMENTS

| | | | |
|---|---|---|---|
| 3,155,908 | 11/1964 | Berman | 179/1.5 R |
| 3,925,612 | 12/1975 | Guanella | 179/1.5 R |

*Primary Examiner*—Howard A. Birmiel

*Attorney, Agent, or Firm*—J. Jancin, Jr.; John E. Hoel

[57] ABSTRACT

Binary information signals which are to be transmitted are combined with a pseudo-random signal wave form such as a pseudo-random sequence of binary bits. Each binary message element, whether a binary "1" or a binary "0", alters successive portions of the pseudo-random binary sequence to thereby create a modified pseudo-random binary bit sequence, successive portions of which represent the binary information. The successive portions of the modified pseudo-random binary sequence are converted to an analog quantity which will be similarly varying in a pseudo-random manner.

21 Claims, 10 Drawing Figures

(F)REQUENCY-(T)IME MATRIX

F-T MATRIX

FIG.6A
F-T MATRIX
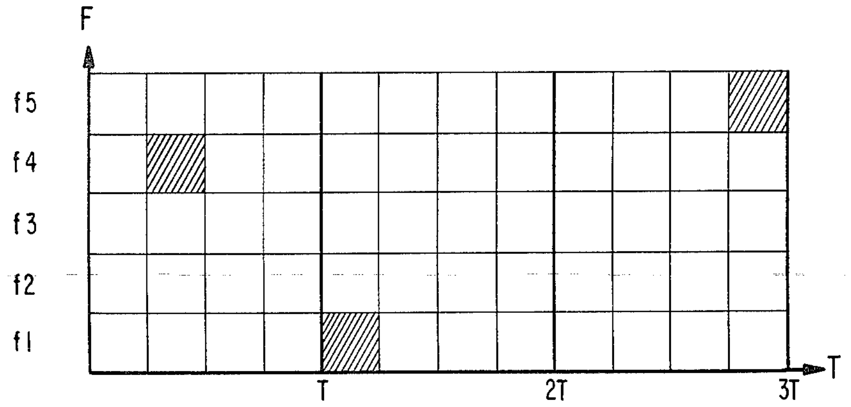
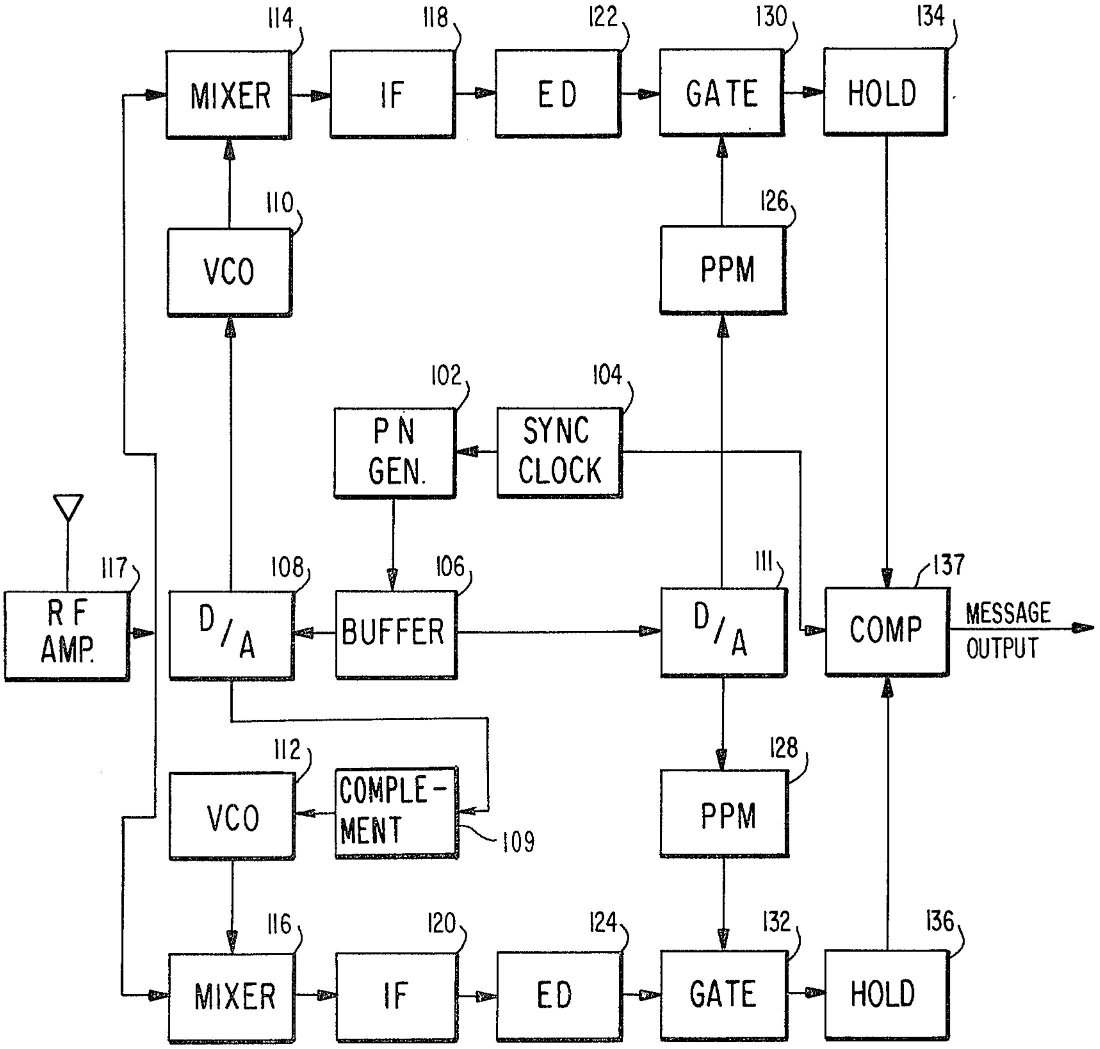
FIG.7

ANTI-JAM COMMUNICATIONS SYSTEM

This application is a streamlined continuation of Ser. No. 378,302, filed June 26, 1964.

This invention relates to communications systems; more particularly, the invention relates to a communications system especially immune against noise.

The prior art is replete with communications systems which attempt to minimize the destructive effects of noise on the reception of information signals. Particularly, an extensive number of approaches have concerned themselves with situations in which the noise is deliberately caused, i.e., when it is man-made to deliberately jam the transmission of information signals. This is most normally achieved by swamping the transmission channel with powerful signals which so override the existing information signals as to render them almost totally unintelligible.

Most prior art approaches which have addressed themselves to this problem, i.e., anti-jam immunity, can be categorized into fairly well defined categories. There are those systems in which the normally narrow information spectrum is caused to continuously and periodically traverse a given range of frequencies in the transmission channel. In such approaches, the transmitted signal is "swept" across the band by so-called "sweep" signals, which vary periodically in the same fashion, both at the transmitter and the receiver. The greatest disadvantage of this category of anti-jam communications systems lies in the rather predictable (since the sweep voltages are periodically recurrent) nature of variations so that these variations can be easily detected and very easily duplicated by a jammer who wishes to "follow and track" the transmitted information signal and "destroy it" at every single location. In other words, because of their predictability, hence easy detectability, so-called "sweep" anti-jam communications systems are not inherently powerful enough to resist the efforts of a sophisticated jammer.

There are those communications systems which attempt to achieve some degree of security by superimposing on the information signal yet another variation, namely a coded variation which is available only to the transmitter and the intended receivers. Again though, because these systems are inherently narrow band systems, in which the information is transmitted through the rather fixed placing of at most two sidebands, the location of these transmissions is easily located and is equally an easy prey to the obliterating effect of a powerful jammer who has ascertained their location. Since all of these systems operate within a fairly confined region of the frequency spectrum, they are relatively helpless against the massive concentration of obliterating signals which the intentional jammer would focus on this confined region.

In summary, then, most existing anti-jam communications systems suffer either from a restricted and vulnerable allocation of the information signal, or a rather predictable variation of the allocation, or both.

Accordingly, it is a principal object of this invention to provide a new and improved communications system immune to noise.

It is another object of this invention to provide an anti-jam communications system which is not confined to a narrow operating region of the frequency spectrum.

It is yet another object of this invention to provide an anti-jam communications system in which the variation of the transmitted signal is not easily detectable, nor periodic.

It is still another object of this invention to provide an anti-jam communications system in which the transmitted information signal is dispersed in either frequency, or time, or both.

Yet another object of this invention is to provide an anti-jam communications system in which either the frequency, or the time, or both, of the transmitted information signal are caused to vary in a pseudo-random manner.

According to the most basic aspect of the invention, binary information signals which are to be transmitted are combined with a pseudo-random signal wave form which preferably comprises a pseudo-random sequence of binary bits. Each binary message element, whether a binary "1" or a binary "0", alters successive portions of the pseudo-random binary sequence to thereby create a modified pseudo-random binary bit sequence successive portions of which represent the binary information. The successive portions of the modified pseudo-random binary sequence are converted to an analog quantity which will similarly be varying in a pseudo-random manner.

According to a first embodiment of the invention, the so generated pseudo-randomly varying analog values are used to control the successive locations of the information signal in the frequency spectrum of the transmission channel. According to such an embodiment, the transmitted information signal will be caused to successively "hop" into pseudo-randomly varying portions of the frequency spectrum.

According to a second embodiment of the invention, the so generated pseudo-randomly varying analog values are used to control the successive time positions of the transmitted information signal. In such an embodiment, the information signal will successively occupy pseudo-random time positions in the transmission channel.

According to a third embodiment of the invention, the so generated pseudo-randomly varying analog values are used to control both the frequency and the time position of the successively transmitted information signals so that the transmitted information signal may be said to be "hopping" in both time and frequency.

At the receiver, successive portions of the same pseudo-random binary sequence used at the transmitter are generated and are thereafter converted to their corresponding analog values so that these analog values can then be used to control either the frequency sensing, or the time sensing, or the frequency and the time sensing portions of the receiver circuitry.

The foregoing and other objects, features and advantages of the invention will be apparent from the following more particular description of an exemplary embodiment of the invention, as illustrated in the accompanying drawings.

In the drawings:

FIG. 6A is a symbolic diagram illustrating the signal conditions in the transmission channel when information is transmitted according to the embodiment of the invention in which both the time and the frequency allocation of the transmitted information signals is varied.

FIG. 7 is a functional block diagram of receiver circuitry according to the invention in which both the frequency and the time allocation of the transmitted information signals is varied.

GENERAL STRUCTURE

Figure 1:
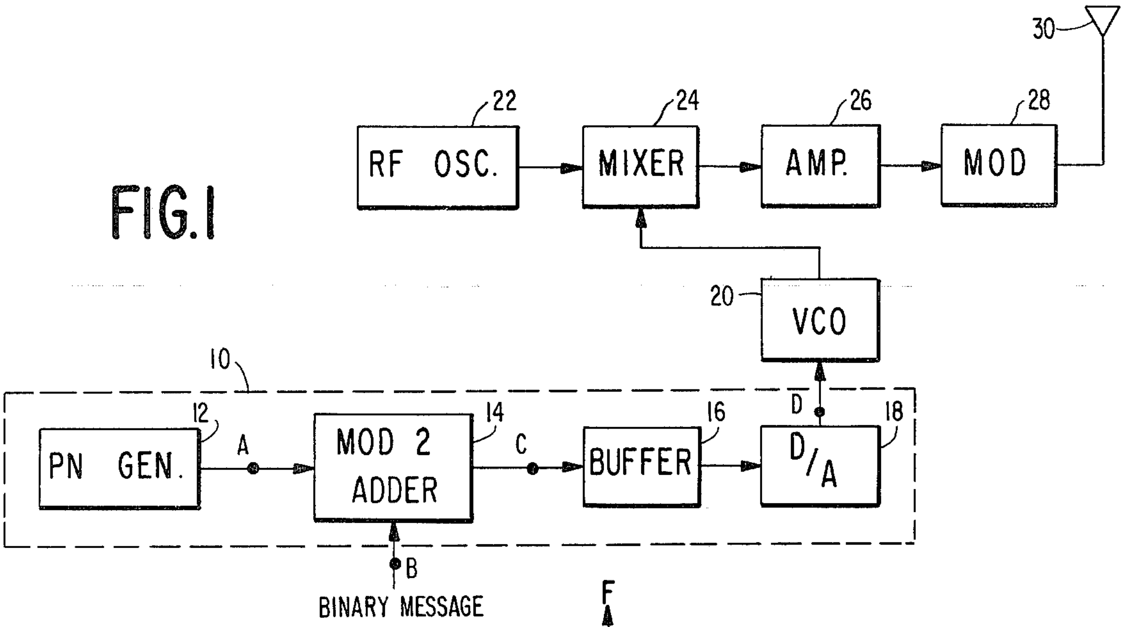
FIG. 1 is a functional block diagram of the transmitter circuitry according to a first embodiment of the invention in which the frequency allocation of the transmitted information signal is varied.

Referring now to FIG. 1, there is shown the transmitting circuitry according to a first embodiment of the invention. Because the circuitry enclosed in dotted lines, block 10, is common to all three embodiments of the invention, it will be discussed first.

Block 10 comprises a pseudo-noise generator 12 which may advantageously be of the type described in more detail in copending application Ser. No. 298,877, filed July 31, 1963, entitled "Communication System", by Herman L. Blasbalg, and assigned to the assignee of this application, the International Business Machines Corporation. As described in the above-mentioned application, and as will be described in detail below, the pseudo-noise generator 12 is adapted to produce a continuing sequence of binary bits varying in a pseudo-random fashion. The pseudo-random bit sequence, produced by the PN generator 12 is applied to a modulo-2 adder 14, well known to those skilled in the art, which also receives the binary message which is to be transmitted, on terminal B. Modulo-2 adder 14 produces an output signal which is a modified version of the pseudo-random noise sequence generated by PN generator 12 and provides the so modified sequence to a conventional buffer storage 16 which serves to accumulate the successively modified portions of the binary pseudo-random sequence produced by PN generator 12. Thereafter, the output of the buffer storage 16 is provided to a digital to analog converter 18, well known to those skilled in the art, which serves to convert the digital value of the portions of the pseudo-random sequence stored in buffer storage 16, to a corresponding analog value.

It can thus be seen, that the block 10 comprises a plurality of circuits which will cause the production of a series, or pattern, of pseudo-randomly varying analog values in accordance with the binary message information applied to terminal B.

GENERAL OPERATION

Referring now to FIGS. 2A–D, there are illustrated the wave forms which may typically occur in the operation of circuitry which comprises the transmitter block 10. As previously described, the transmitter block 10 is generic to all three embodiments of the invention, and its general operation will be the same for all of them.

Figure 2:
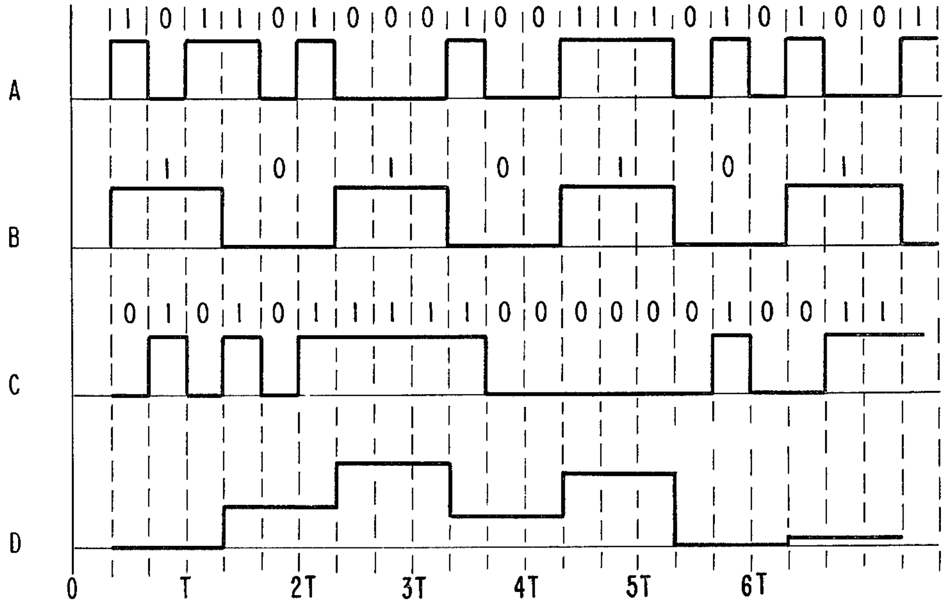
FIGS. 2A–2D are wave diagrams illustrating the generation of the pseudo-randomly varying analog wave forms utilized in each of the three embodiments of the invention.

The PN generator 12 produces a pseudo-random binary bit sequence, such as is shown in FIG. 2A. The sequence varies in a pseudo-random manner between the two possible binary values and as previously mentioned, the generation of such a pseudo-random binary sequence may be advantageously achieved by circuitry disclosed in more detail in the above-mentioned copending application. Briefly, as there described, the PN generator 12 may comprise a maximal-length shift register which generates a so-called M-sequence whose mathematical properties are well known. Such a sequence is nonperiodic over a substantial number of bits and will not repeat itself, except as noted.

During the operation of any of the embodiments of the invention, PN generator 12 will continuously produce an assembly of binary bits which varies in a pseudo-random fashion and this sequence of bits, illustrated in FIG. 2A, is provided to the modulo-2 adder 14, along with the binary message wave form, illustrated in FIG. 2B. As shown in FIGS. 2A and B, the ratio of the number of bits of the pseudo-random sequence to one bit of the binary message wave form is advantageously an integral number greater than one. Thus, FIG. 2B shows that for every message bit of binary information, there occur three bits of the pseudo-random sequence.

It should be emphasized that the above-mentioned ratio is chosen for illustration only and that the ratio could well be greater than three, i.e., there might be provided four, five, or six, or any number, of bits of the pseudo-random binary sequence for each message bit. This is a factor which is determined principally by the desired complexity of the system and in this instance, the example is used purely for illustrative purposes, and not in a limiting sense.

Continuing with the description, modulo-2 adder 14, when provided with the pseudo-random sequence of FIG. 2A, and the binary message sequence, shown in FIG. 2B, proceeds to combine the two wave forms in a modulo-2 fashion and produces on its output terminal C, the wave form shown in FIG. 2C. As those skilled in the art will recognize, the modulo-2 addition of predetermined portions of the pseudo-random sequence of FIG. 2A, namely, a so-called sub-sequence (in this case, of three bits) with the binary message wave form, shown in FIG. 2B, will provide an output wave form which is comprised of a series of sub-sequences joining together to form a new and modified pseudo-random sequence. The modified pseudo-random sequence, shown in FIG. 2C, is the complemented version of the corresponding portion of the pseudo-random sequence of FIG. 2A, everytime the binary message bit is a binary "1", and it is identical to the pseudo-random sequence of FIG. 2A for that portion during which the binary message bit is a binary "0". Thus for example, comparing FIGS. 2A, B, and C, it is noted that the 101 sub-sequence of the pseudo-random bit sequence of FIG. 2A is complemented to a 010 sub-sequence by the modulo-2 adder responding thereto and the binary "1"message bit. Similarly, the second sub-sequence of three bits of the sequence of FIG. 2A, which comprises a 101, when combined with the binary "0"binary message bit in modulo-2 adder 14, will produce the identical 101 sub-sequence on output terminal C of the modulo adder 14. Likewise, all subsequent sub-sequences of the pseudo-random binary bit sequence generated by pseudo-noise generator 12, and shown in FIG. 2A, are similarly modified by the binary message wave form applied, along with the pseudo-random bit sequence, to the modulo-2 adder 14.

The successive sub-sequences generated by the modulo-2 adder 14, (FIG. 2C), are provided to a buffer storage 16 which accumulates the bits of FIG. 2C until their number reaches the required number to constitute a sub-sequence. When the requisite number of bits to constitute a sub-sequence have been accumulated in the buffer storage 16, means (not shown herein but of the type disclosed in copending application Ser. No. 247,940, filed Dec. 28, 1962 and assigned to the assignee of this application, the International Business Machines Corporation), provide the accumulated digital value of the sub-sequence to the digital to analog converter 18 to cause it to produce an analog value corresponding to the digital sub-sequence then stored in the buffer storage 16. As successive sub-sequences are entered into the buffer storage 16, the digital to analog converter 18 will generate successively varying analog values, as shown in FIG. 2D. Since these analog values, as well as the information embodying pattern of sub-sequences shown in FIG. 2C, all derive from the pseudo-random sequence (FIG. 2A) produced by pseudo-noise generator 12, the output of digital to analog converter 18 will also vary in a pseudo-random manner. This is shown by the wave form in FIG. 2D, wherein the successive sub-sequences of three bits (FIG. 2C) cause the digital to analog converter 18 to produce a series, or pattern, of pseudo-randomly varying analog values in response to the binary message information.

In general, since the analog values depend on the accumulated digital values of the sub-sequences, there will be $2^n$ distinct analog values. In the present example, $n=3$ and there will thus be 8 distinct analog values.

FIRST EMBODIMENT

Transmitter

Returning now to FIG. 1, the digital to analog converter 18 (whose operation has just been described in connection with the GENERAL OPERATION) provides a conventional voltage controlled oscillator (VCO) 20 with the pattern of pseudo-randomly varying analog values. VCO 20, in turn, provides one input to a mixer 24 whose other input derives from a conventional RF oscillator 22. Mixer 24 produces an output signal which is the product of the constant RF oscillator frequency and the pseudo-randomly varying frequency produced by the VCO 20, and provides this product signal to a conventional amplifier 26 before it is transmitted to a conventional modulator 28 which will cause the antenna to transmit either the upper, or the lower, sideband of the pseudo-randomly varying mixing signal, or both.

Figure 1A:
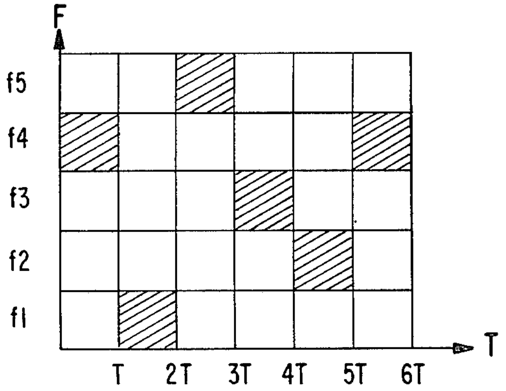
FIG. 1A is a schematic representation of the signal conditions in the transmission channel according to the first embodiment of the invention.

In operation, the successive analog values generated by the digital to analog converter 18 in response to the binary message bits and sub-sequences of the pseudo-random sequence produced will cause the antenna A to transmit a signal whose location in the frequency spectrum is varied in a pseudo-random fashion. As shown in more detail in FIG. 1A, which shows a representative symbolic diagram of the transmission channel over which the information signals are transmitted, the transmitted signals are caused to occupy successively different frequency portions of the transmission channel. Thus, the first signal will be located around a center frequency f4, while the next transmission interval may find the transmitted information signal spaced around the center frequency f1. Similarly, the successive time intervals 3T, 4T, 5T, etc. find the spectrum of the transmitted information signal to be spaced, pseudo-randomly, about 2n different frequencies. Very aptly, this mode of transmission may be characterized as a "frequency-hopping" mode of transmission, in which the successive locations of the transmitted signals are the events which actually convey the information.

Returning, for a moment, to FIGS. 2A–2D, it should be appreciated that the successive locations of the transmitted information signals are determined by both the binary message signals, shown in FIG. 2B, and the sub-sequences of the pseudo-random bit sequences shown in FIG. 2A. As will become apparent below, this knowledge is sufficient to synthesize the detection circuitry at the receiver.

RECEIVER

Figure 3:
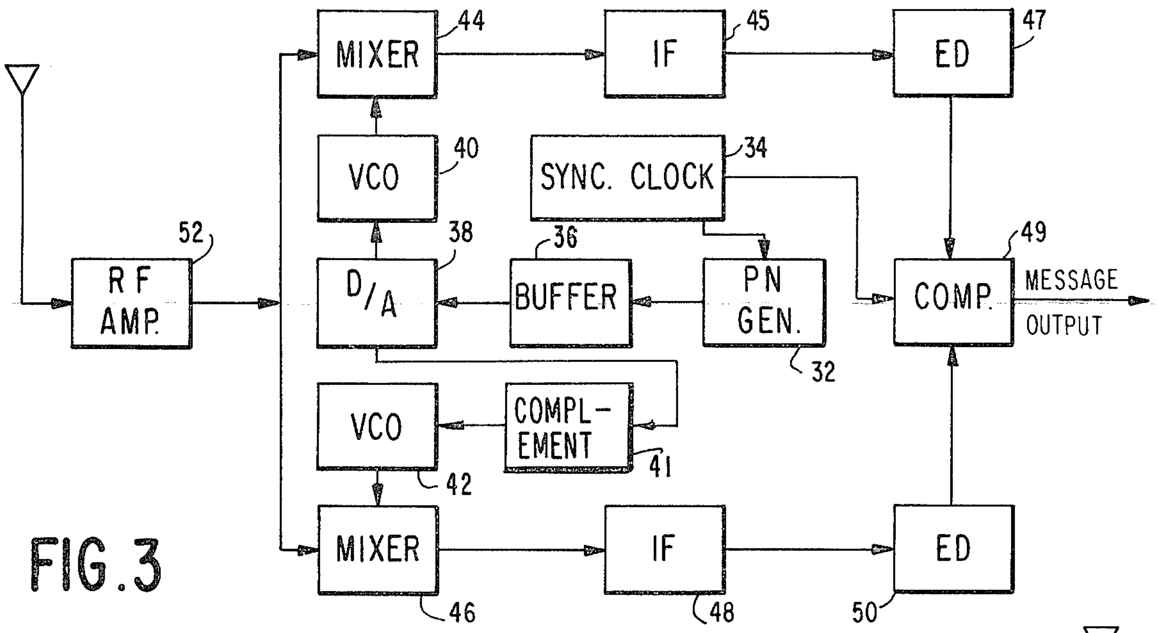
FIG. 3 is a functional block diagram of the receiver circuitry according to the first embodiment of the invention in which the frequency allocation is varied.

Turning now to FIG. 3, there is shown the functional block diagram of a receiver according to the embodiment of the invention in which information signals are transmitted by pseudo-random frequency hops.

A PN generator 32, identical to PN generator 12 (FIG. 1) used at the transmitter, and synchronized therewith by means of a synch clock 34, produces a pseudo-random bit sequence (e.g., shown in FIG. 2A) identical to the sequence produced at the transmitter. A buffer storage means 36 accumulates from the produced sequence, a sufficient number of bits to constitute a series of sub-sequences of the same size as previously described with reference to the transmitter structure (e.g., 3 bits). Upon the accumulation of the requisite number of bits to constitute a sub-sequence, the buffer storage 36 provides the accumulated digital value thereof by conventional means (not shown) to a digital to analog converter 38 which controls two voltage controlled oscillators 40, 42. The voltage controlled oscillators 40, 42 control respective mixer circuits 44 and 46 which also are responsive to the RF signals received by the RF amplifier 52. Mixers 44 and 46 mix the respective VCO frequencies with the RF frequencies and provide them to respective IF sections 45 and 48, according to conventional procedures as those skilled in the art will recognize.

As the reader will recall, the information transmitted by the transmitter was developed through the modification of a pseudo-random bit sequence according to whether the binary message bit was a binary "1" or a binary "0". That is, as a comparison between FIGS. 2A and 2C will show, the pseudo-random bit sequence was complemented when, and as long as, the binary signal was a binary "1"; similarly, the binary pseudo-random bit sequence was unaltered when and as long as, the binary message signal was a binary "0". Accordingly, the analog values used to control the frequency "slots" in which the transmitted information signal is placed, are determined by the analog value of either the unaltered sub-sequence, or the complement thereof so that the signal could be transmitted in either one of the two possible frequency locations.

This a priori knowledge is available to the receiver; accordingly, when the PN generator 32 supplies the buffer 36 with sub-sequences which are identical to the sub-sequences developed at the transmitter, the digital to analog converter 38 will control the voltage controlled oscillator 40 with the analog value of the digital value stored in the buffer storage means 36, while the voltage controlled oscillator 42 will be controlled by the analog value of the complement stored in the buffer storage means 36. In other words, the receiver knows that the transmitter must have transmitted in a frequency "slot" determined either by the analog value of the sub-sequence or the complement thereof and the receiver therefore embodies this knowledge and controls the respective mixers 44 and 46 so as to be responsive to either of the two possible locations in which the signal could have been transmitted.

The respective envelope detectors 47, 50 detect the magnitude of the signal in each of the two possible frequency slots in which a signal could have been transmitted and furnish the detected magnitudes to a comparator circuit 49 which will determine which of the envelope detectors 47, or 50, sensed the larger signal. If, for example, it is decided that the envelope detector 47 sensed the larger signal, then a binary "1" is produced by the comparator circuit 49 to indicate that a binary "1" was sensed; conversely, if the envelope detector 50 detected the larger signal, then the comparator 49 will issue a binary "0" output signal.

As is shown in FIG. 3, the synch clock 34, while stepping the PN generator 32 in synchronism with PN generator 12 at the transmitter, also supplies signals to the comparator 49 so as to gate it for comparison only at the proper intervals to cause it to compare the signals sensed after the accumulation of each and every sub-sequence in the buffer storage means 36. Since the transmitted signals will hop in the frequency spectrum at time intervals determined by the amount of time necessary to accumulate a sub-sequence in either of the buffer storage means 16 (FIG. 1) and 36 (FIG. 3), it is necessary only to compare signals sensed in the respective portions of the frequency spectrum at these intervals.

In summary then, according to the first embodiment of the invention, the information to be transmitted lies in the nature of the pseudo-random frequency hops which the transmitted information signal undergoes. The actual location of the transmitted informational signal within the spectrum of the transmission channel is determined by the analog value of a digital sub-sequence, or the complement thereof. Since both the transmitter and the receiver generate identical and synchronized pseudo-random sequences, it is possible to extract identical sub-sequences to control the transmission, and reception of, the information signals. In short, it is accurate to say that the pseudo-random frequency hops are performed jointly by both the transmitter and the receiver to overcome any destructive effects of deliberate interference in any one or more frequency slots. As can be recognized, the pseudo-random nature of the frequency hops would be difficult to detect by a would-be-jammer and he will therefore be forced to jam across a very wide band to compensate for his lack of knowledge. Since the possible number of frequency slots can be varied at will, this forces the jammer to disperse his available power over wider and wider bandwidths which consequently decreases the likelihood that information transmission will be obliterated at any one location within the spectrum.

SECOND EMBODIMENT

Transmitter

Figure 4:
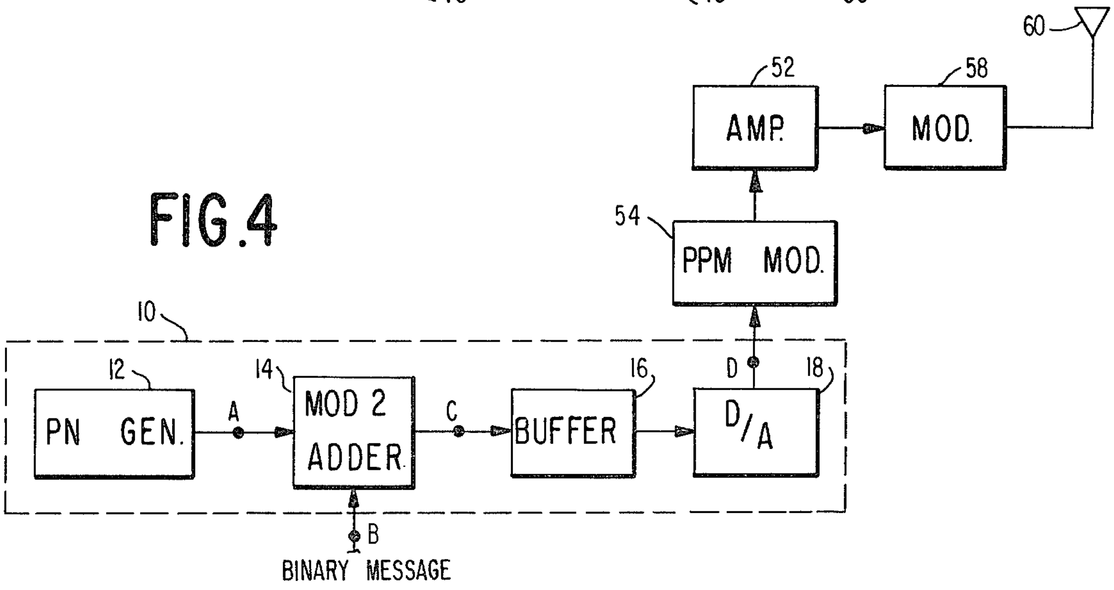
FIG. 4 is a functional block diagram of the transmitter circuitry according to a second embodiment of the invention in which the time position of the transmitted information signal is varied.

Turning now to FIG. 4, there is shown a functional block diagram of a transmitter according to an embodiment of the invention which the time position, rather than the frequency position, of the transmitted signals is varied in a pseudo-random manner. Because some of the functional blocks shown in FIG. 4 for the transmitter according to the second embodiment of the invention are the same as those that would be used for the invention where the frequency position of the transmitted signals is varied, they have been labeled with the same numbering as used in FIG. 1. Briefly, these elements comprise a PN generator 12 which supplies a pseudo-random binary bit sequence to the modulo-2 adder 14, which is also supplied with the binary message signals on terminal B. The output of the modulo-2 adder 14 is provided to a buffer storage means 16 which serves to accumulate for each binary bit, a predefined number of bits of the selectively altered, or unaltered, portions of the pseudo-noise sequence generated by PN generator 12. As previously described, these predefined number of bits form a so-called sub-sequence whose digital value, when converted to an analog value by the digital to analog converter 18, will cause the generation of a series of pseudo-randomly varying analog levels such as shown in FIG. 2D.

FIG. 4 also shows a PPM modulator 54, well known to those skilled in the art, which is responsive to the series of analog values for generating pulses in a time position, or time "slot", as determined by the analog values. The PPM modulator 54 thus places pulses in selected locations within defined time intervals as will be described more in detail below. An amplifier 56 is responsive to the signals produced by the modulator 54 and applies its pulse output to a modulator 58 which thereafter may transmit either the upper, or the lower, or both, sidebands of the information pulse over the antenna 60.

Figure 4A:
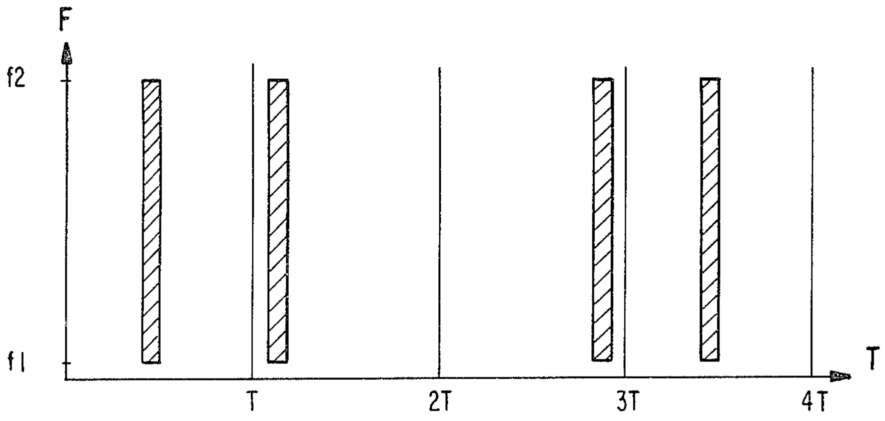
FIG. 4A is a symbolic diagram illustrating the signal conditions existing in the transmission channel when a time-hopping signal transmission occurs.

As previously described, the circuitry within block 10 will issue to the PPM modulator 54 a series of varying analog values which cause the PPM modulator 54 to shift the time occurrence of an information pulse to selected locations within a larger timing interval T such as is shown in FIG. 4A.

FIG. 4A shows a symbolic diagram representing the signal conditions in the transmission channel and it shows that the pulse signals emitted by the antenna 60 span a frequency range between F1 and F2. This frequency range is identical for all the pulses, but it is noted that inspection of the (F) frequency (T) time matrix will show that these pulses, essentially dispersed over a substantially wide frequency range, occur with a variable spacing from the reference time intervals T, 2T, 3T, etc. As can be appreciated, the variation of successive information pulses within a time interval T is entirely determined by the series of analog values being supplied to the PPM modulator 54. In a very real sense therefore, it can be said that the embodiment of FIG. 4 is one in which a "time-hopping" technique is utilized, since the successive locations of the pulses within a time interval T vary in a pseudo-random manner over a number of successive time intervals T.

Receiver

Figure 5:
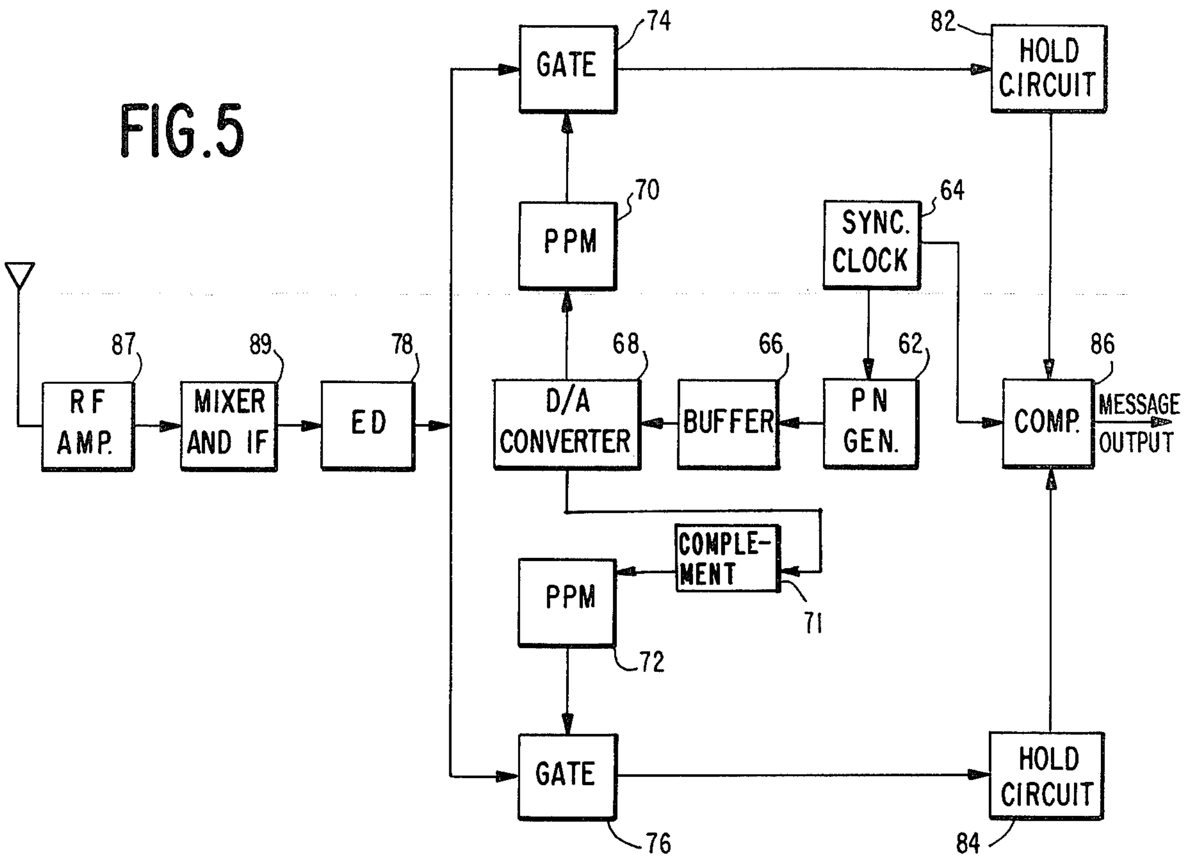
FIG. 5 is a functional block diagram of the receiver circuitry according to the second embodiment of the invention in which the time position is varied.

Turning now to FIG. 5, there is shown a functional block diagram of the receiver according to the embodiment of the invention in which a "time-hopping" technique of transmission is utilized.

The receiver comprises a PN generator 62 which is controlled by a synch clock 64 to produce a pseudo-random-binary bit sequence identical to, and in synchronism with, the pseudo PN generator 12 of the transmitter of FIG. 4. Successive sub-sequences produced by PN generator 62 are accumulated in the buffer storage means 16 and are thereafter provided to the digital to analog converter 68 which supplies the PPM modulator 70 with the analog value of the digital quantity stored in buffer storage 66, while it also supplies the PPM modulator 72 with the complement of the digital value stored in buffer storage 66. The respective PPM modulators 70 and 72, control respective gates 74 and 76 so as to open them and allow them to pass signals only at time "slots" as determined by the analog values produced by the digital to analog converter 68. When opened, the respective gates 74, 76 pass signals from the envelope detector 78 to respective hold circuits 82 and 84 which accept, and retain, the magnitude of the signals passed through the respective gates. A comparator circuit 86 accepts the outputs of the respective hold circuits 82 and 84 and is also controlled by pulses from the synch clock 64 to make a comparison between the signals from the hold circuits 82, 84 at time intervals which will be described below. As can be seen, the remaining structure in the receiver circuitry shown in FIG. 5, includes a conventional RF amplifier 87 which supplies its output to a conventional mixer and IF stage 89. These elements are well known to those skilled in the art, and their function will therefore need no further description.

The overall operation of the receiver circuit shown in FIG. 5 is again dependent on the a priori knowledge that the pseudo-random bit sequences generated both at the transmitter, and at the receiver by the PN generator 62, are identical and in synchronism with respect to each other. Therefore, since it is also known that the transmitter will either complement, or leave unaltered, successive sub-sequences in the pseudo-random sequence, according to whether the binary message information is a binary "1" or binary "0", it is only necessary to provide for both of these possibilities and open the respective gates 74 and 76 during time intervals which correspond to the two possible time intervals determined by a sub-sequence or the complement thereof. Accordingly, the digital to analog converter 68 is responsive to the contents, namely a sub-sequence, stored in the buffer storage means 66 and converts both that digital value, and the complement thereof, to corresponding analog voltage and furnishes these to the respective PPM modulators 70 and 72 which thereafter control the proper opening of the gates 74, 76. It is known that the signal will be transmitted during one of these two intervals but which one in fact does contain the information is not known until the hold circuits 82 and 84 have an opportunity to provide their inputs to the comparator circuit 86 which will decide which of the two time channels contains the larger signal. The comparator circuit 86 makes such a decision at intervals which are determined by the synch clock 64 and which intervals correspond to the interval T shown in FIG. 4A. Since the comparison is made at the end of each of these intervals, the synch clock 64 will issue periodic pulses to the comparator 86 to cause it to make a comparison at those times, and will thereafter discharge the comparator 86 so as to prepare it for a subsequent comparison to be made in the next time interval T.

In summary then, the second embodiment of the invention relies on the generation of a set of pseudo-randomly varying analog values from the combination of a pseudo-random binary sequence with a binary message sequence, and utilizes these pseudo-randomly varying analog values to control the successive time positions of the transmitted information signals. A jammer therefore, to be effective must not only disperse his jamming power across a wide range of frequencies F1 and F2, but must also, unless he knows the precise time slots in which the pulses will occur (which is very difficult to know), bracket the entire time interval T with his energy. This is quite difficult since it would require enormous amounts of energy to substantially interfere with the "time-hopping" information signal.

THIRD EMBODIMENT

Transmitter

Figure 6:
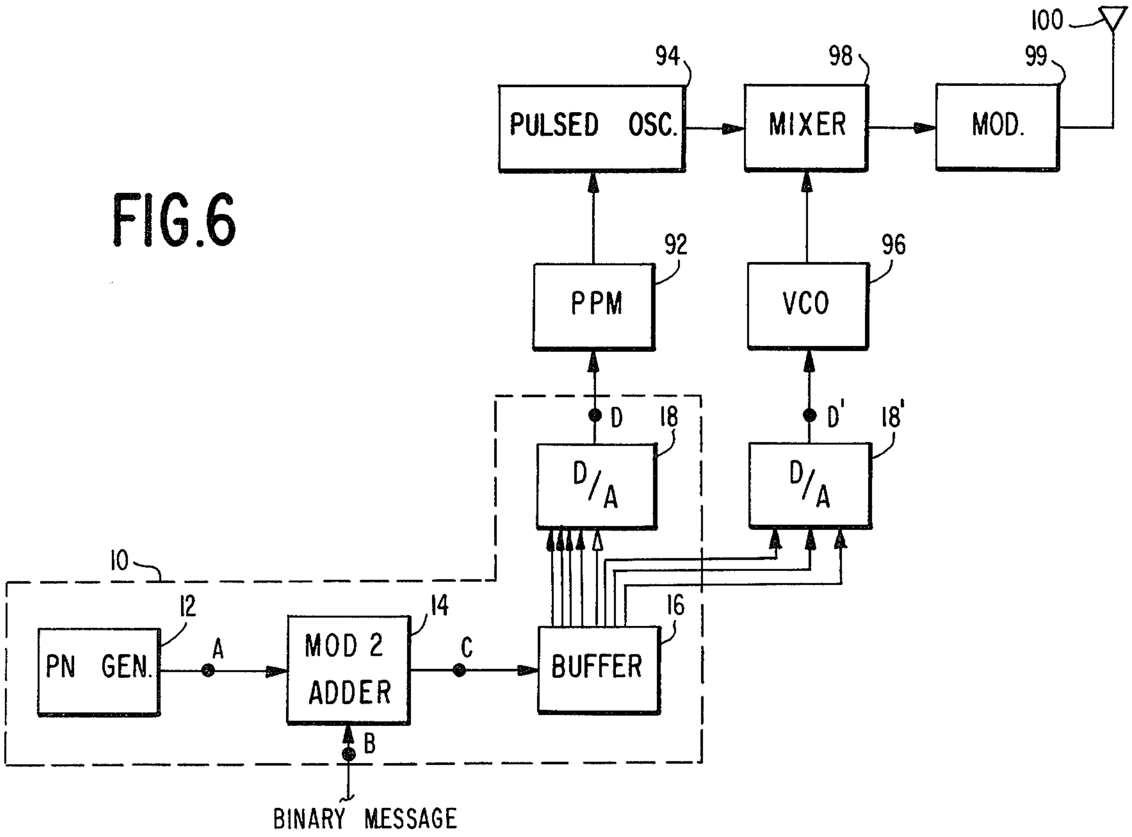
FIG. 6 is a functional block diagram of the transmitter circuitry according to a third embodiment of the invention in which both the frequency and the time allocation of the transmitted information signal is varied.

Turning now to FIG. 6, there is shown a functional block diagram of the transmitter according to an embodiment of the invention in which both the time, and frequency, "slot" of the transmitted signal is varied in a pseudo-random manner. Briefly, the transmitter according to FIG. 6, comprises the standard grouping of circuit discussed with reference to FIGS. 1 and 3, and is outlined in the dotted block 10. Additionally, the transmitter circuitry of FIG. 6 differs from the prior embodiments in that a second digital to analog converter 18' is provided which is responsive to a different portion of the sub-sequence stored in buffer storage means 16. The respective digital to analog converters 18 and 18' control a PPM modulator 92 and a voltage controlled oscillator 96 respectively. These two elements (92, 96) control, respectively, the time position, and the frequency location, of the transmitted information signals in a fashion as previously described. Namely, the PPM modulator 92 controls a pulse oscillator 94 to emit a pulse at a time controlled by the PPM modulator 92 while the VCO 96 controls the mixer 98 to shift the frequency locations of the pulse developed by the oscillator 94 to a given portion of the frequency spectrum. The output of the mixer circuit 98 is thereafter provided to a modulator 99 which will cause the transmission of either the upper, or the lower, or both sidebands of the information signal over the antenna 100.

In the operation, the PN generator 12 will, as previously described, develop a pseudo-random binary bit sequence which is selectively altered by the binary message signals applied via terminal B to the modulo-2 adder 14. This results in the production, on the output terminal C of modulo-2 adder 14, of a wave form shown and previously described with respect to FIG. 2A. The buffer storage means 16 accepts successive sub-sequences of the pseudo-random sequence developed and will furnish a predefined portion, i.e., the first five bits, to the digital to analog converter 18, and will supply a second predetermined number of bits, i.e., the second three bits, in the digital to analog conerter 18'. While as previously noted, the description with respect to the first and second embodiments had, for purposes of illustration, limited the size of a particular sub-sequence to three bits, an embodiment such as FIG. 6 would preferably operate with more than three so that each of the digital to analog converters 18, 18' would normally be supplied with a number of bits sufficient to provide at least 8 different analog values. Thus, in an embodiment which is designed for both frequency and time-hopping, the size of a sub-sequence would be larger than three bits (of the pseudo-random sequence).

The successively different sub-sequences provided by the buffer storage means 16 to the respective digital to analog converters 18, 18', will result in the generation of two different sets of pseudo-randomly varying analog values, one of which will pseudo-randomly vary the successive time occurrence of the transmitted information pulses, while the other will successively, and pseudo-randomly, vary the frequency location of the transmitted information signals, in a fashion as previously described with respect to the first and the second embodiments of the invention.

Reference to FIG. 6A will disclose the nature of the signal conditions in the transmission channel. In the illustrated instance, in which both frequency and time-hopping of the transmitted information signal is utilized to convey the information, the situation will be as depicted in FIG. 6A. During successive time intervals T, the transmitted information signal will occupy successively different squares within the F-T matrix shown in FIG. 6A. Thus, during the first time interval T, the signal will occur within the second sub-time interval, centered around a frequency F4, while in the second time interval between T and 2T, the signal will occur in the first sub-time interval, centered around a frequency F1. Similarly, subsequent time periods will find the signals placed within different squares of the matrix.

It should be apparent at this time, that the size of the F-T matrix in any of the embodiments is determined by the size of the sub-sequences which are used to furnish all the possible different analog values for controlling the placing of the signals. It is clear that this determination can be made to accommodate a number of different requirements. Thus, for example, where it is decided to make a highly complex system, a great number of bits would be chosen to constitute a desired sub-sequence; similarly, when the anti-jam protection required is not as high, a lesser number of bits would suffice. In any event, the choice is open for the designer.

Receiver

Turning now to FIG. 7, there is shown the functional block diagram of a receiver according to the embodiment of the invention in which both frequency and time-hopping of the transmitted information signal is used.

A PN generator 102, controlled in synchronism with PN generator 12 by the synch clock 104, generates a pseudo-random binary bit sequence identical to, and in synchronism with, the pseudo-random binary bit sequence generated at the transmitter. A buffer storage means 106 accepts successive sub-sequences of a predetermined size and provides both the digital value of the sub-sequences, and the complement thereof, to respective digital to analog converters 108 and 111. Since, as will be recalled, the transmitter structure of FIG. 6 provides for the allocation of a first determined number of bits of a sub-sequence to control the frequency hopping of the transmitted signal, and a second predetermined number of the bits of the sub-sequence to control the time-hopping, the buffer storage means 106 likewise allocates the identical number of bits of the sub-sequence respectively to the digital to analog converters 108 and 111. The digital to analog converter 108 supplies the respective voltage controlled oscillators 110 and 112 with the analog value of both its sub-sequence, and the complement thereof, so that the respective mixers 114 and 116 are tuned to the two possible locations of the frequency spectrum which may be occupied by the transmitted informaton signal, as sensed by the RF amplifier 117. After suitable mixing in the mixers 114 and 116, the signal is processed by respective IF sections 118, 120, and thereafter detected in respective envelope detectors 122 and 124, as is well known to those skilled in the art.

Similarly, the digital to analog converter 111 supplies the respective PPM modulators 126 and 128 with the analog value of its sub-sequence, and the complement thereof, so that the respective gates 130, 132 may be opened during one of the two possible time intervals in which the transmitted information signal is apt to be. Thereafter, the signals so passed by the gates 130, 132 are provided to respective hold circuits 134 and 136 which provide their respective outputs to a comparator 137 so that a decision can be made as to which one of the channels contains the larger signal. According to that decision, the output of the comparator 137 will reflect the binary message transmitted by the transmitter.

As noted with respect to the description of FIG. 6, each corresponding sub-sequence of the pseudo-random binary sequence produced at the transmitter will result in the signal being transmitted in one of two possible frequency locations, and in one of two time positions. Which of either of these positions is actually occupied by the transmitted signal depends upon whether the binary message information is a binary "1" or binary "0". Since the receiver does not know in advance which of the channels will actually hold the information, it must detect the signal conditions in both of the possible frequency locations, and in both of the two possible time slots, and thereafter make a comparison to decide which of these combinations contained the larger signal. This is the function of the comparator circuit 137 which compares the respective output of the hold circuits 134 and 136.

In summary then, according to the third embodiment of the invention, information signals have been transmitted by pseudo-randomly varying both the frequency, and the time slots which the successively transmitted signals will occupy. It should be apparent that unless a jammer has the ability to swamp all of the frequency locations, all of the time, he cannot hope to destroy the transmitted information signals. The other alternative, namely, of discovering the pattern of hops, both in time and in frequency, is a very unlikely one since these hops are controlled by pseudo-random sequences which are extremely difficult to decipher by anybody except the party who knows the precise pseudo-random sequence being utilized to control the transmission of the information signals. Therefore, an intentional jammer is faced with extremely high requirements of skill, or power, or both, if he wants to accomplish any successful interference with the transmission according to the third embodiment of the invention.

SUMMARY

There have been described three embodiments of an invention according to which either the time position, or the frequency location, or both, of a transmitted information signal is varied in a pseudo-random fashion. In each of the embodiments of the invention, the pseudo-random variation of at least one of the parameters of the transmitted information signal is achieved by deriving from pseudo-random binary bit sequences, sub-sequences of a specified length and altering these sub-sequences in accord with the binary message information to be transmitted. Each sub-sequence has one of two possible values according to whether the binary information to be transmitted as a binary "1" or "0"; and, when the successive digital sub-sequences are converted to analog values, they may be so used to control either the time position, or the frequency position, of the transmitted information signal, or both.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In an anti-jam communications system wherein binary message signal representations are to be transmitted, the combination comprising:
- a source for producing an oscillating electrical signal;
- a source of binary message bits;
- a source of pseudo-random signals for producing a pseudo-random sequence of bits, each bit 1/N the length of said binary message bit where N is greater than one;
- a modulo-two adder responsive to said binary message bits and said pseudo-random sequence of bits for producing a pseudo-random sequence of bits modified by said binary message bits;
- digital to analog conversion means responsive to said modified pseudo-random sequence of bits for producing a pseudo-randomly varying series of analog values; and
- means responsive to said analog values for varying the oscillating electrical signal in accordance with said analog values.

2. In an anti-jam communication system wherein binary message signal representations are to be transmitted, the combination comprising:
- a source of binary message signals;
- transmitter means including,
  - a source for producing an oscillating electrical signal;
  - a first source of pseudo-random signals for producing a pseudo-random sequence of bits;
  - a modulo-two adder responsive to said sequence of bits and said binary message signal for producing a first sub-sequence of binary bits when said binary message signal is a binary "1," and for producing a second sub-sequence of binary bits when said binary message signal is a binary "0," whereby said adder produces pseudo-random sub-sequences for each binary message bit;
  - first digital to analog conversion means responsive to the sub-sequences produced by said adder means for converting the digital value thereof to an analog value, whereby, over the cource of a number of binary message bits, said conversion means produces a pseudo-randomly varying analog value; and
  - means responsive to said pseudo-randomly varying analog values for pseudo-randomly varying said oscillating electrical signal in accordance with said analog value to produce said binary message signal representation; and
- receiver means including,
  - a second source of pseudo-random signals for producing a second pseudo-random sequence of binary bits, said second source being synchronized with said first pseudo-random source;
  - second digital to analog conversion means responsive to said second pseudo-random sequence of binary bits for generating the two analog values corresponding both to the digital value of a sub-sequence and the complement thereof; and
  - means responsive to said two analog values generated by said second digital to analog conversion means for detecting the transmitted binary message signal representations.

3. In an anti-jam communication system wherein binary message signal representations are to be transmitted, the combination comprising:
- a source of binary message signals;
- transmitter means including,
  - a source for producing an oscillating electrical signal;
  - a first source of pseudo-random signals for producing a pseudo-random sequence of bits;
  - a modulo-two adder responsive to said sequence of bits and said binary message signal for producing, for each message bit, either one of two sub-sequences according to their said message bit in a binary "1," or a binary "0," said two sub-sequences being complementary with respect to each other, whereby said modulo-two adder produces a different sub-sequence of a fixed number of bits for each message bit;
  - first digital to analog conversion means responsive to said sub-sequences for converting the digital value thereof to an analog value, whereby said conversion means produces a pseudo-randomly varying set of analog values; and
  - means responsive to said analog values for varying the oscillating electrical signal in accordance with said analog values to produce said binary message signal representations; and
- receiver means including,
  - a second source of pseudo-random signals for producing a second pseudo-random sequence of bits, said second source being synchronized with said first source, whereby said second generates a pseudo-random sequence identical to that produced by said first source;
  - second digital to analog conversion means responsive to said second pseudo-random sequence of binary bits for generating the two analog values corresponding both to the digital value of a sub-sequence and the complement thereof; and
  - means responsive to said two analog values generated by said second digital to analog conversion means for detecting the transmitted binary message signal representations.

4. In an anti-jam communicating system wherein binary message signal representations are to be transmitted, the combination comprising:
- means for transmitting a pseudo-randomly varying information signal;
- receiver means for receiving said information signal, said receiver means including,
  - a source of pseudo-random signals for producing a pseudo-random sequence of bits;

digital to analog conversion means responsive to said pseudo-random sequence of bits for simultaneously generating the corresponding analog values of the actual and complemented value of successive pseudo-random subsequences, whereby said conversion means generates two series of complementarily varying analog values; and means responsive to said two series of analog values for detecting said pseudo-randomly varying information signal.

5. An anti-jam communication system in which binary message signal representations are to be transmitted to a receiver, the combination comprising:

a source of binary message signals;

transmitter means including, a source for producing an oscillating electrical signal;

a first source of pseudo-random signals for producing a pseudo-random sequence of bits;

mod-2 addition means responsive to said message signals and said sequence of bits for producing a sequence of bits complementary to the sequence produced by said source when said binary message contains a binary "1," and, for producing a sequence of bits identical to the sequence produced by said source when said binary message contains a binary "0," whereby said means produces a pattern of sub-sequences with each subsequence corresponding either to the unaltered or the complemented version of the corresponding portion of the pseudo-random sequence produced by said source;

first digital to analog conversion means responsive to said sub-sequences of bits for converting the value thereof to a corresponding analog value, whereby said conversion means produces a pseudo-random pattern of analog values;

means responsive to said analog values for varying the oscillating electrical signal in accordance with said analog values, said means including means for shifting the frequency spectrum of said oscillating electrical signal in accordance with said pattern of analog values, whereby the position in the spectrum occupied by said oscillating electrical signal changes for each bit of the message signal to produce said binary message signal representations; and receiver means including, a second source of pseudo-random signals for producing a second pseudo-random sequence of bits, said second source being synchronized with said first source, whereby said first and said second sources produce synchronized and identical pseudo-random binary sequences;

second digital to analog conversion means responsive to the pseudo-random binary sequence produced by said second source for producing the corresponding analog value of both a subsequence and the complement thereof, whereby said second conversion means produces two pseudo-random patterns of analog values; and means responsive to said two pseudo-random patterns of analog values for detecting said binary message signal representations, said means including a first detection means responsive to one of said two pseudo-random patterns for sensing signals present in a first portion of the frequency spectrum, and a second detection means responsive to the other of said two pseudo-random patterns for sensing signals present in a second portion of the frequency spectrum.

6. Apparatus according to claim 5 wherein said detection means each include at least one voltage controlled oscillator.

7. Apparatus according to claim 5 wherein said transmitter means includes buffer storage means interposed between said mod-2 addition means and said first digital to analog conversion means, and said receiver means includes buffer storage means interposed between said second source and said second digital to analog conversion means.

8. Apparatus according to claim 5 wherein said receiver means further include:

means for comparing the relative magnitude of signals sensed in said first and said second portions of the frequency spectrum of the transmission channel, whereby said comparison means indicates the reception of a binary "1" or "0" according to whether said first or said second portion contained the larger signal.

9. An anti-jam communication system in which binary message signal representations are to be transmitted to a receiver, the combination comprising:

a source of binary message signals;

transmitter means, including, a first source of pseudo-random signals for producing a first pseudo-random sequence of bits;

means responsive to said message signals and said sequence of bits for producing a sequence of bits complementary to the sequence produced by said source when said binary message contains a binary "1", and, for producing a sequence of bits identical to the sequence produced by said source when said binary message contains a binary "0", whereby said means produces a pattern of sub-sequences with each sub-sequence corresponding either to the unaltered or the complemented version of the corresponding portion of the pseudo-random sequence produced by said first source;

first digital to analog conversion means responsive to said sub-sequences of bits for converting the value thereof to a corresponding analog value, whereby said conversion means produces a pseudo-random pattern of analog values;

means responsive to said analog values for varying the transmitted signal representations in accordance with said analog values, said means including means for shifting the time position of said transmitted signal representations in accordance with said pattern of analog values, whereby the respective time positions occupied by said transmitted signal representations changes for each bit of the message signal; and receiver means including, a second source of pseudo-random signals for producing a second pseudo-random sequence of binary bits, said second source being synchronized with said first source, whereby said first and second sources produce synchronized and identical pseudo-random binary sequences;

second digital to analog conversion means responsive to said second pseudo-random sequence for producing the corresponding analog values of both a sub-sequence and the complement thereof, whereby said second conversion means produces two pseudo-random patterns of analog values; and means responsive to said two pseudo-random patterns of analog values for detecting said transmitted signal representations, said means including a first detection means responsive to one of said two pseudo-random patterns for sensing signals present in a first time position, and a second detection means resposive to the other of said two pseudo-random patterns for sensing signals present in the other of said two time positions.

10. Apparatus according to claim 9 wherein said shifting means include a pulse position modulator.

11. Apparatus according to claim 9 wherein said transmitter means includes buffer storage means interposed between said modulo means and said digital to analog conversion means, and said receiver means include buffer storage means interposed between said second source and said second digital to analog conversion means.

12. Apparatus according to claim 9 wherein said receiver means further include comparison means responsive to the signals detected by said first and said second detection means for indicating which of said two time positions contained the larger signal.

13. An anti-jam communication system in which binary message signal representations are to be transmitted to a receiver, the combination comprising:

a source of binary message signal representations;

transmitter means including, a first source of pseudo-random signals for producing a first pseudo-random sequence of bits;

means responsive to said message signals and said sequence of bits for producing a sequence of bits complementary to the sequence produced by said source when said binary message contains a binary "1", and, for producing a sequence of bits identical to the sequence produced by said source when said binary message contains a binary "0", whereby said modulo means produces a pattern of sub-sequences with each subsequence corresponding either to the ulaltered or the complemented version of the corresponding portion of the pseudo-random sequence produced by said source;

first and second digital to analog conversion means each responsive to a different predetermined portion of consecutive sub-sequences of said sequence for converting the digital value thereof to a corresponding analog value, whereby said first and said second digital to analog conversion means each produce a pseudo-random pattern of analog values;

means responsive to said analog values for varying the transmitted signal representations in accordance with said pseudo-random analog values, said means including first means for varying the time position of the transmitted signal representations in response to the analog values produced by said first conversion means, and second means for shifting the frequency spectrum of said transmitted signal representations in response to the analog values produced by said second conversion means, whereby both the time and the frequency position of said transmitted signal representations is caused to be different for the transmission of each message bit; and receiver means including, a second source of pseudo-random signals for producing a second pseudo-random sequence of bits, said second source being synchronized with said first source whereby said first and said second sources produce synchronized and identical pseudo-random binary sequences;

third and fourth digital to analog conversion means each responsive to portions of successive subsequences of said second pseudo-random sequence thereof for each producing two pseudo-random patterns of analog values, one for a subsequence and one for the complement thereof; and means responsive to said pseudo-random patterns of analog values for detecting said transmitted signal representations, said means including first means responsive to the analog values produced by said third conversion means for sensing signals present in the two portions of the frequency spectrum specified by said analog values, and including second means responsive to the two analog values produced by said fourth conversion means for sensing signals present in the two time positions specified by said two analog values.

14. Apparatus according to claim 13 wherein said transmitter means include buffer storage means interposed between said modulo means and said first and second to analog conversion means and wherein said receiver means include buffer storage means interposed between said second source of pseudo-random bits and said third and fourth digital to analog conversion means.

15. Apparatus according to claim 13 wherein the first means included in said receiver means comprise first and second voltage controlled oscillators.

16. Apparatus according to claim 13 wherein the second means included in said receiver means comprise first and second pulse position modulators.

17. Apparatus according to claim 16 wherein said receiver means further includes:

first and second voltage controlled oscillators included within said first means;

a first and second receiver channel, each responsive to one of said voltage controlled oscillators and one of said pulse positioned modulators, with each channel including frequency mixing means for tuning the receiver to a predetermined portion of the frequency spectrum and also including gating means for rendering said receiver means capable of detecting signals during one of a predetermined number of time periods; and comparing means connected to both of said channels for determining which of said two channels contained the larger signal.

18. A method for transmitting binary data in the form of transmitted electrical signals comprising the steps of:

generating a pseudo-random binary sequence composed of bits each bit 1/N the length of a binary message bit where N is greater than one;

modulating said pseudo-random sequence with binary message bits; and successively controlling at least one parameter of the transmitted signals in response to the analog values of successive portions of said modulated pseudo-random sequence.

19. In a communication system in which the transmitted signal is adapted to be placed within an F-T checkerboard matrix, the method of causing pseudo-random variations of the locatin of said transmitted signal within said matrix, comprising the steps of:

producing a pseudo-random sequence of binary bits, each of said bits 1/N the length of a binary message bit where N is greater than one;

modulo-2 adding to successive portions of said sequence the value of successive binary message bits;

converting successive portions of said binary message sequence to which said binary message bits have been added into successive analog values; and controlling the successive values of at least one of the parameters of said transmitted signal in response to said successive analog values.

20. A method according to claim 19 wherein the frequency of the transmitted signal is successively varied in response to said successive analog values.

21. A method according to claim 19 wherein the time position of the transmitted signal is successively varied in response to said successive analog values.

* * * * *

UNITED STATES PATENT AND TRADEMARK OFFICE

CERTIFICATE OF CORRECTION

PATENT NO. : 4,231,113

DATED : October 28, 1980

INVENTOR(S) : Herman L. Blasbalg

It is certified that error appears in the above—identified patent and that said Letters Patent is hereby corrected as shown below:

Sheet 1 of the drawings should be deleted to appear as per attached.

Signed and Sealed this

*Tenth* Day of *March 1981*

[SEAL]

*Attest:*

RENE D. TEGTMEYER

*Attesting Officer* *Acting Commissioner of Patents and Trademarl*